United States Patent [19]
Nakashima et al.

[11] 3,818,273
[45] June 18, 1974

[54] BARRIER ISOLATOR DEVICE EMPLOYING AN OVERLOAD PROTECTION CIRCUIT

[75] Inventors: Tatsunari Nakashima; Susumu Ohta, Tokyo, both of Japan

[73] Assignee: Yokogawa Electric Works, Ltd., Tokyo, Japan

[22] Filed: Jan. 22, 1973

[21] Appl. No.: 325,376

Related U.S. Application Data
[63] Continuation of Ser. No. 236,691, March 21, 1972, abandoned.

[30] Foreign Application Priority Data
Mar. 26, 1971 Japan.................. 46-18284

[52] U.S. Cl................ 317/22, 317/31, 317/33 SC, 317/33 VR
[51] Int. Cl. .......................................... H02h 3/38
[58] Field of Search....... 317/22, 33 VR, 31, 33 SC; 323/9

[56] References Cited
UNITED STATES PATENTS
3,582,713  6/1971  Till.............................. 317/33 VR
3,684,924  8/1972  Miller........................... 317/33 VR

*Primary Examiner*—James D. Trammell
*Attorney, Agent, or Firm*—Bryan, Parmalee, Johnson & Bollinger

[57] ABSTRACT

A barrier isolator device is disclosed for interconnecting a voltage source in a safe area, a load (such as a sensing element) in a hazardous area, and a load-associated device (such as a recorder) in a safe area. The barrier isolator device includes an overload protection circuit arranged to transmit signals between the load and the load-associated device, a first isolating circuit connecting the voltage source with the overload protection circuit, and a second isolating circuit connecting the load-associated device with the overload protection circuit. The protective circuit is characterized by low voltage losses in normal operation, low power consumption in a fault condition, and automatic resetting. The protective circuit comprises a current control means, such as a transistor, in series with the load and controlling the current flowing through the load by varying its conductivity. A current detection means, such as a low valued resistor, is connected in series with the load to detect the predetermined limiting value of current, and a voltage detection means, such as a resistive voltage divider, is connected parallel to the voltage source for detecting the predetermined limiting value of voltage. The current control means is arranged to be responsive to the current and voltage detection means to react to either a current or voltage overload condition by reducing its conductivity to limit current flow through, and voltage across, the load. Under normal conditions the current control means inserts a conducting transistor's collector-emitter circuit in series with the load, and the current detecting means inserts a low valued resistor in series with the load, and hence the overload protection circuit introduces only a small series voltage loss. The voltage detecting means places large valued resistors in parallel with the voltage source, and any bias voltages provided to the current control means by the voltage source can be supplied through similar large valued resistors, and hence there is little power consumption during a voltage overload condition. The current control means and the voltage and current detection means are arranged to automatically restore themselves when overload conditions vanish. Accordingly, the overload protection circuit is highly suitable for use in intrinsically safe circuitry arranged to prevent excess energy from entering a hazardous environment, such as an explosive environment.

18 Claims, 11 Drawing Figures

FIG. 1
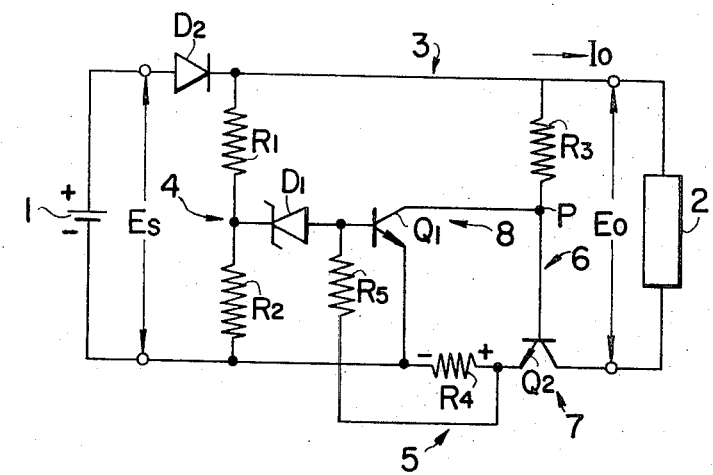
FIG. 2
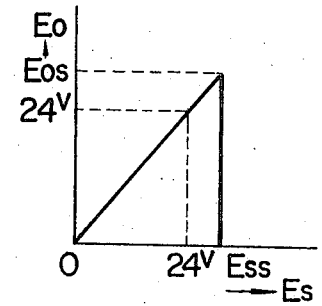
FIG. 4
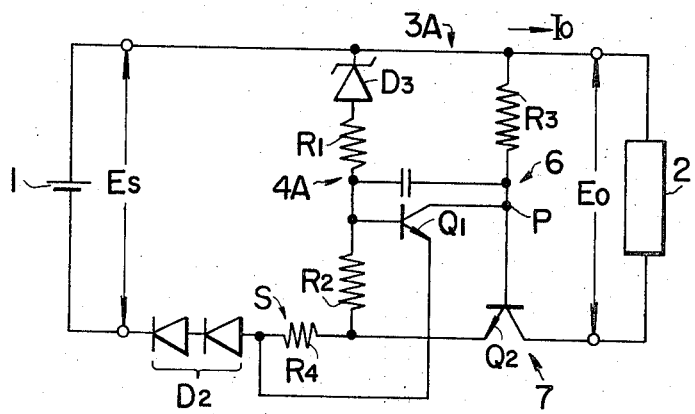
FIG. 3
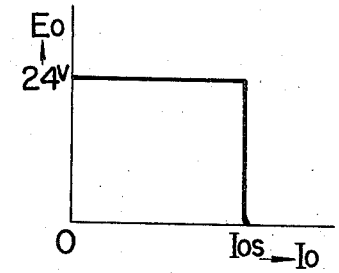
FIG. 5
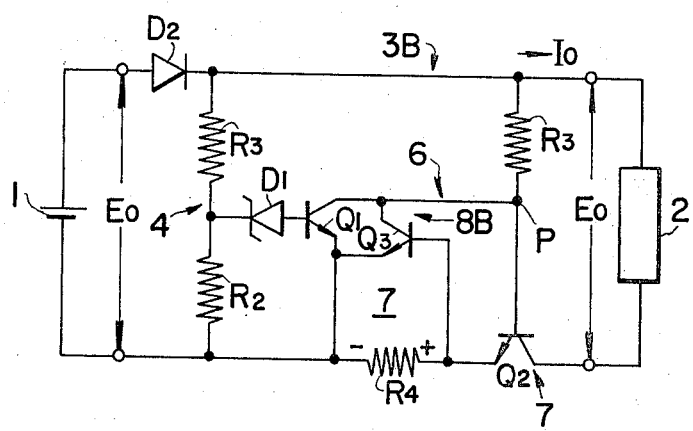
FIG. 6
FIG. 7
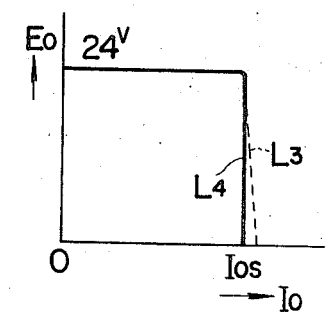

BARRIER ISOLATOR DEVICE EMPLOYING AN OVERLOAD PROTECTION CIRCUIT

CROSS REFERENCE TO RELATED APPLICATIONS

This is a continuation of Ser. No. 236,691 filed Mar. 21, 1972 now abandoned.

BACKGROUND OF THE INVENTION

1. Field of the Invention

This invention relates to a barrier insolator device for use with a load in a hazardous area incorporating to a protective circuit of the type suitable for connection between a voltage source and a load to prevent current and voltage in excess of predetermined values from being applied to the load, thus protecting against damage to the load or development of a condition in the load, such as excessive heat dissipation, which is undesirable in the load environment, for example, an explosive environment.

2. Description of the Prior Art

Protective circuits which guard against the application of excess voltage and current exist in several different forms. One such circuit, typifying the problems presented by such protective circuits, comprises a resistor, a zener diode, and a fuse. One drawback of this type of circuit is that the resistance of the circuit in normal operation is relatively large and hence the circuit introduces both a power loss and a series voltage loss. The voltage loss caused by the protective circuit requires the load to be operated at a lower voltage, which may require it to be specially designed. A second drawback of this type of circuit is large power consumption during voltage overload conditions, when a large current flows through the resistor and zener diode. Still another drawback is that the fuse, the final protective element against excess voltage and current is not automatically resettable, but requires replacement. These drawbacks have led to complications in design of intrinsically safe circuits isolating a load located in a hazardous area from excess electrical energy, because to include an overload protection circuit for the load requires a specially designed load or voltage source, requires electrical elements capable of consuming substantial power in a breakdown condition, and requires that the circuit be easily accessible for replacement of fuses after breakdown.

SUMMARY OF THE INVENTION

Objects of the present invention are to provide a barrier isolator device with an overload protection circuit which prevents current and voltage in excess of predetermined values from being applied to a load, which provides a small voltage loss in the normal operating state, which has low power consumption when an overload condition exists, which is automatically reset when the normal operating state resumes, and in which the predetermined values of excess voltage and current are independently determinable.

The barrier isolator device according to the invention interconnects a voltage source in a safe area, a load (e.g., a sensor) in a hazardous area, and a load-associated device (e.g., a recorder) in a safe area. The device comprises an overload protection circuit arranged to transmit signals between the load and the load-associated device, a first isolating circuit connecting the voltage source with the overload protection circuit, and a second isolating circuit connecting the load-associated device with the overload protection circuit. In further aspects of the invention, the overload protection circuit comprises voltage detection means connected in parallel with the voltage source for detecting the predetermined value of voltage, and current detecting means connected in series with the load for detecting the predetermined value of current. A current control means is simultaneously responsive to the voltage detecting means and current detecting means, and is connected in series with the load to control the current flowing through the load by varying its conductivity, thereby preventing the excess current or voltage from being applied to the load. The current control means preferably includes a transistor collector-emitter circuit inserted in series with the load for varying conductivity, and the current detecting means preferably positions a small resistance in series with the load, and hence the series resistance of the protective circuit is small during normal operating conditions. In addition, the voltage detecting means preferably employs a resistive voltage divider with large resistors, and hence only a small amount of power is consumed during the voltage overload. The current control transistor has its conductivity regulated by a transistor control circuit arranged to restore the conductivity of the control transistor when overload conditions end. Accordingly, the protective circuit of the present invention is ideally suited for incorporation into intrinsically safe instrumentation.

Other objects, aspects and advantages of the invention will be pointed out in, or apparent from, the detailed description hereinbelow, considered together with the following drawings.

DESCRIPTION OF THE DRAWINGS

FIG. 1 is a schematic diagram illustrating an overload protection circuit according to the invention;

FIGS. 2 and 3 are graphs illustrating the voltage and current cutoff characteristics of the circuit of FIG. 1;

FIGS. 4 and 5 are schematic diagrams illustrating modifications of the invention;

FIGS. 6 and 7 are graphs illustrating the voltage and current cutoff characteristics of the circuit of FIG. 5;

DESCRIPTION OF THE PREFERRED EMBODIMENTS

Figure 8:
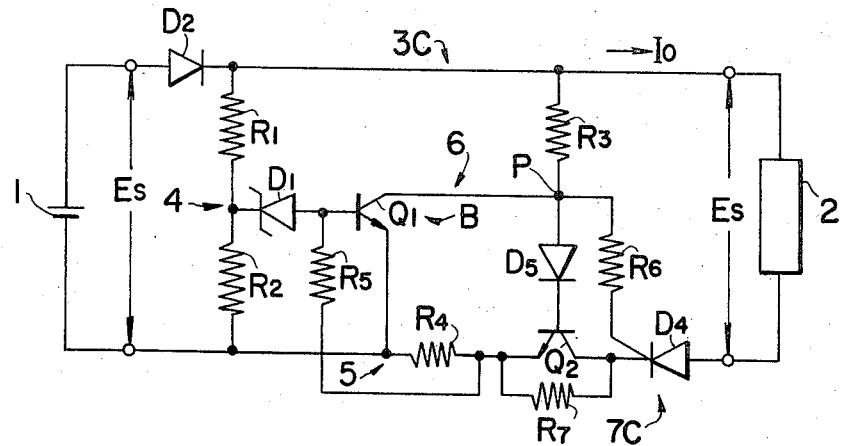
FIG. 8 is a schematic diagram illustrating another modification of the invention.
Figure 9:
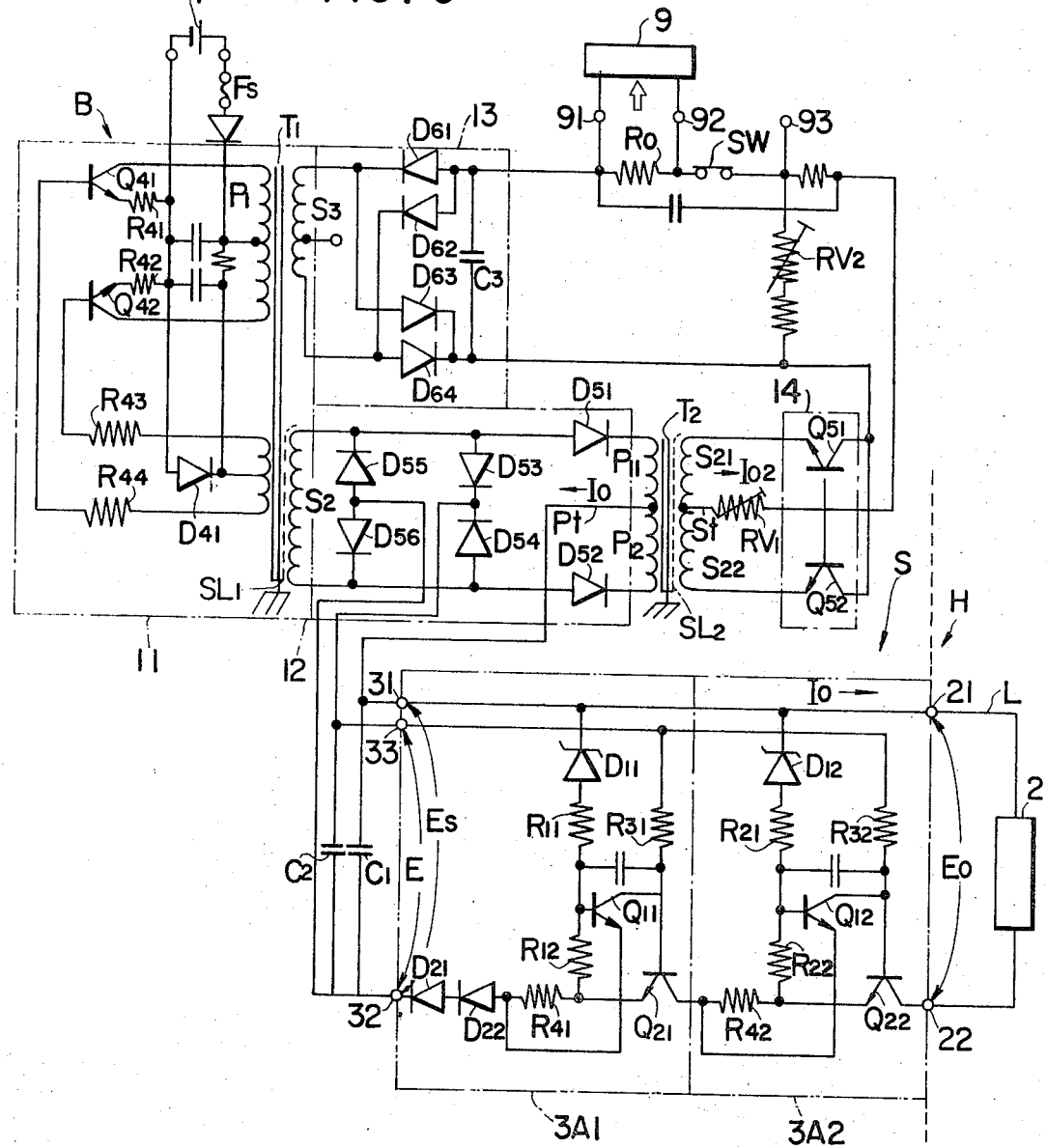
FIG. 9 is a schematic diagram illustrating a barrier isolation circuit incorporating the overload protection circuit of the present invention.
Figure 11:
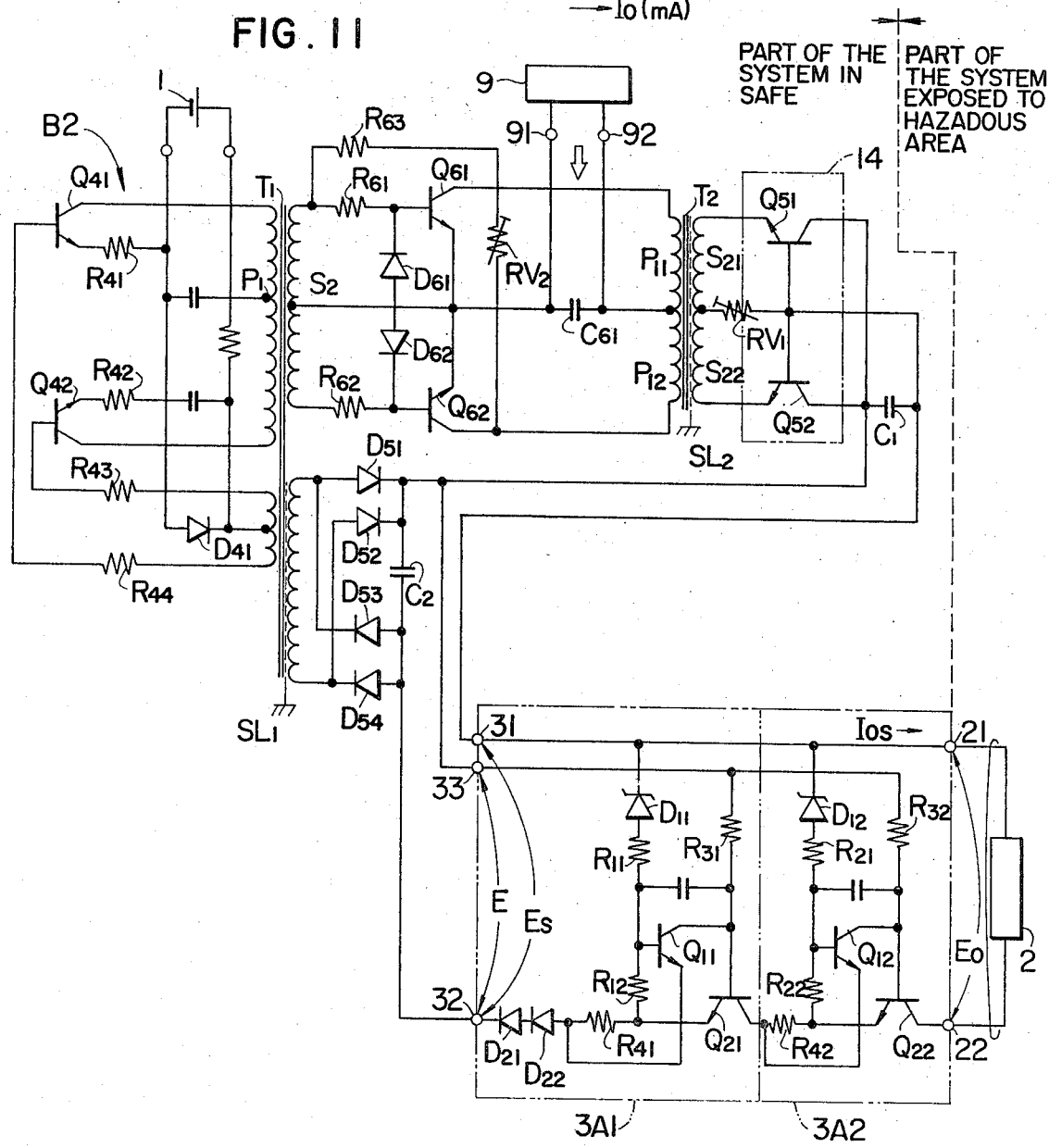
FIG. 11 is a schematic diagram showing a second barrier isolating circuit incorporating the present invention.

FIGS. 9 and 11 illustrate barrier isolator devices B and B2 incorporating overload protection circuits of the type illustrated in FIGS. 1-8 and described below.

FIG. 1 illustrates a voltage source 1, a load 2, and an overload protection circuit 3 connecting the voltage source 1 to the load 2 and, in accordance with the present invention, preventing current and voltage in excess of independently predetermined values from being applied to the load 2. The voltage source 1 is illustrated schematically as a low voltage DC battery, for example of 24 volts, but other voltage sources may be used. The load 2 may comprise, for example, various types of instruments requiring electrical power, such as a sensing element, a transmitter, or a controlled element driven by the output signal of a controller drive put in place of voltage source 1.

In the overload protection circuit 3, input voltages Es in excess of a predetermined or set value Ess are detected in a voltage detection circuit 4 connected in parallel to voltage source 1. Load currents Io in excess of a predetermined or set value Ios are detected by a current detecting circuit 5 in series with the load 2. A current control means 6 provides a variable conductivity in series with the load 2 and is responsive to both the voltage detection means 4 and the current detection means 5, to vary conductivity and thereby control the load current and voltage. The variable conductivity of current control means 6 is provided by a controllable element 7, such as a transistor, connected in series with the load and governed by a control circuit 8 responding to the voltage detection circuit 4 and current detection circuit 5.

As shown in FIG. 1, the voltage detecting circuit 4 comprises voltage divider resistors R1 and R2 connected in parallel with voltage source 1 and a zener diode D1 connecting the junction of resistors R1 and R2 to the base terminal of a transistor Q1, which forms the input to control circuit 8. When the voltage developed across resistor R2 exceeds the zener voltage of diode D1 and the base-emitter threshold voltage of transistor Q1, then base current will flow. By suitably selecting the resistance ratio of R1 and R2 and the zener voltage of diode D1, it is apparent that any predetermined value Ess of input voltage Es can be selected to cause a signal to be applied through zener diode D1 to control circuit 8.

Current detection circuit 5 comprises a reisistor R4 connected in series with load 2 and thereby carrying the load current Io. Resistor R4 is also connected across the base-emitter circuit of transistor Q1 by means of a resistor R5. When the voltage drop across resistor R4 exceeds the threshhold base-emitter voltage of transistor Q1, then base current flows.

The controlled conductivity element 7 is formed with a transistor Q2 having its collector-emitter circuit in series with load 2, and having its base connected to a source of bias current which, as shown, can be provided through a resistor R3 connected to the positive side of voltage source 1. Transistor Q2, when so supplied with base current, is turned on and offers little resistance to load current Io flowing through its collector-emitter circuit.

The conductivity of transistor Q2 is controlled by transistor Q1 in control circuit 8 in the following manner. Transistor Q1 has its collector connected to the source of bias current supplying transistor Q2, i.e., to the junction point P between resistor R3 and the base of transistor Q2. The emitter of transistor Q1 is connected between resistor R4 and the negative side of voltage source 1. Accordingly, the collector-emitter circuit of transistor Q1 shunts or bypasses the base-emitter circuit of transistor Q2 and is capable of diverting away from transistor Q2 some or all of the bias current supplied through resistor R3, thereby reducing the conduction of transistor Q2 or fully turning off transistor Q2.

Voltage overload protection results when the input voltage Es exceeds the predetermined overload value Ess at which the voltage at the junction of resistors R1 and R2 exceeds the sum of the zener voltage of diode D1 and the threshhold base-emitter voltage of transistor Q1. A current then flows into the base of transistor Q1 to turn transistor Q1 on to divert the supply of base current away from transistor Q2. Transistor Q2 turns off, and the collector-emitter circuit of transistor Q2 becomes non-conductive. The load 2 is thus disconnected from the voltage source 1, and the protective circuit 3 has prevented the excess voltage from being applied to load 2. When the input voltage Es subsequently falls below the predetermined overload voltage Ess, zener diode D1 stops conducting, transistor Q1 stops conducting, and transistor Q2 resumes conducting and reconnects load 2 to voltage source 1. These operations are illustrated graphically in FIG. 2, which shows the load voltage Eo (vertical coordinate) as a function of input voltage Es (horizontal coordinate). As soon as input voltage Es reaches the predetermined overload voltage Ess, the load 2 is disconnected and immediately the output voltage Eo drops to a low level and remains there as the input voltage Es is increased further.

Current overload protection results when the load voltage IO, passing through resistor R4, reaches its predetermined overload value Ios and develops a voltage across resistor R4 of Ios R4 which matches the base-emitter threshold voltage of transistor Q1 and causes it to become more conductive, with the consequence that transistor Q2 becomes less conductive and limits current to the level Ios. Any tendency of the load current Io to increase produces an amplified response from transistor Q1 causing transistor Q2 to cut off, thereby counteracting the increase. This operation of overload protection circuit 3 is illustrated graphically in FIG. 3, which shows load voltage Eo (vertical coordinate) as a function of load current Io (horizontal coordinate). The load current Io does not increase beyond the predetermined overload value Ios because as load current Io increases, the collector-emitter circuit of transistor Q2 increases its resistance to carry a greater proportion of the voltage Es provided by voltage source 1 with the result that the load voltage Eo decreases, ultimately becoming zero when transistor Q2 is fully turned off. When the load current falls below the predetermined overload value Ios, transistor Q1 is turned off and normal operation is automatically restored. The foregoing description of overload conditions assumed an overload with the same polarity as voltage source 2. If a voltage overload occurs with a polarity opposite to that of voltage source 1, a diode D2 connected in series with voltage source 1 becomes an open circuit and disconnects load 2 from the voltage overload.

Overload protection circuit 3 requires some elements to withstand overload conditions. During a voltage overload condition, when load 2 is effectively disconnected by transistor Q2, the overload voltage is applied between the collector and emitter of transistor Q2 and also across resistor R1 (since the voltage across resistor R2 is limited to the zener voltage of diode D1 plus the base-emitter threshold voltage of transistor Q1) and across resistor R3. Accordingly, transistor Q2 should be selected to have a peak collector-emitter voltage $V_{ceo}$ higher than the peak expected excess voltage. As described below, with reference to FIG. 8, however, a silicon controlled rectifier may be used to reduce the peak collector-emitter voltage which transistor Q2 must withstand. Similarly, resistors R1 and R3 must be capable of consuming power at the expected peak excess voltage impressed across them. The power consumed in resistors R1 and R3 during a voltage overload is small since the resistances R1, R2 and R3 can be made very high, for example, on the order of tens or hundreds of kilohms.

FIGS. 4, 5 and 8 illustrate overload protection circuits 3A, 3B and 3C, respectively, which contain modifications to the overload protection circuit 3 illustrated in FIG. 1.

Overload protection circuit 3A, shown in FIG. 4, has a voltage detection circuit 4A comprising a zener diode D3 connected in series with voltage divider resistors R1 and R2, the junction of resistors R1 and R2 being connected to the base of transistor Q1. When the input voltage Es exceeds the zener voltage of diode D3, a current flows through resistor R1 and into the base of transistor Q1 to turn it on, causing transistor Q2 to turn off to disconnect the load 2 from voltage source 1. In addition, the current detecting resistor R4 is connected between resistor R2 and the negative side of voltage source 1. When the voltage source developed across resistor R4 by load current Io rises sufficiently to turn transistor Q1 on, transistor Q2 becomes less conductive and thereby limits the flow of current to the predetermined overload value Ios. In protection circuit 3A, resistor R4 is connected across the base-emitter circuit of transistor Q1 through voltage divider resistor R2 rather than through a resistor R5 as in protection circuit 3.

Overload protection circuit 3B, shown in FIG. 5, has a control circuit 8B in which transistor Q1 responds only to the voltage detection circuit 4 and in which a second transistor Q3 is provided to respond to the current detection resistor R4. As shown in FIG. 5, transistor Q3 has its collector and emitter connected to the collector and emitter of transistor Q1 to shunt the base-emitter current of transistor Q2, and current detecting resistor R4 is connected between the base and emitter of transistor Q3. By eliminating the circuit through resistor R5 which shunts the baseemitter circuit of transistor Q1 in FIG. 1, the voltage cutoff characteristic is sharpened. Moreover, the current cutoff characteristic is also sharpened because transistor Q3 has no added resistor such as R5 in its base circuit to mask changes in voltage across resistor R4.

The nature of the improvements in cutoff characteristics provided by the modified control circuit 8B of FIG. 5 is shown graphically in FIGS. 6 and 7, which compare the cutoff characteristics provided by overload protection circuit 3B with the cutoff characteristics provided by overload protection circuit 3, previously described with reference to FIGS. 2 and 3. In FIGS. 6 and 7 the broken lines L1 and L3 represent the cutoff characteristics provided by overload protection circuit 3, while the solid lines L2 and L4 represent the sharpened cutoff characteristics provided by the overload protection circuit 3B of FIG. 5.

Overload protection circuit 3C illustrated in FIG. 8 has a controllable conductivity element 7C which includes, in addition to transistor Q2, a thyristor or silicon controlled rectifier D4 connected in series with transistor Q2. The gate terminal of thyristor D4 is connected through a resistor R6 to the junction point P to provide a source of gating current. The necessary gating voltage is provided by a diode D5 connected between the junction point P and the base of transistor Q2. A resistor R7 shunts the collector-emitter circuit of transistor Q2. During normal operation, with transistor Q1 turned off, transistor Q2 conducts and a sufficient voltage is developed across diode D5 and the base-emitter circuit of transistor Q2 to gate the thyristor D4 into conduction. During a condition of excess voltage, however, transistor Q2 turns off and the voltage through diode D5 and the base-emitter circuit of transistor Q2 drops below the gate turn on level of thyristor D4. Resistor R7 is selected to have a sufficiently high resistance to cause the current flowing through thyristor D4 to become smaller than its minimum holding current, so that the thyristor D4 turns itself off and disconnects the load 2 from voltage source 1. The thyristor D4 bears most of the excess voltage because resistor R7 shunts the collector-emitter circuit of transistor Q2, thereby enabling relatively abundant thyristors, capable of withstanding high forward voltage, to be used in the circuit in place of transistors with an equally high peak collector-emitter voltage capability. Automatic resetting is provided when the excess voltage condition ends, because transistor Q2 turns on and a gating signal is again applied to thyristor D4 by means of the voltage drop through diode D5 and the base-emitter circuit of transistor Q2, and thyristor D4 once again conducts.

A further modification of overload protection circuit 3 or 3A may be achieved by eliminating the zener diodes D1 and D3 from the voltage detector circuits 4 and 4A respectively. With this modification, the voltage overload protection depends only on the base-emitter voltage characteristic of transistor Q1, and the cutoff characteristic is less sharp, but this amount of cutoff degradation may be acceptable for some uses.

FIG. 9 illustrates a barrier isolator device B incorporating tandem overload protection circuits 3A1 and 3A2 similar to overload protection circuit 3A of FIG. 4. In this embodiment, the load 2 represents a sensing element such as, for example, a two-wire system transmitter for detecting pressure and transmitting the detected signal to a device 9, such as a recorder. This transmitter is shown located in a hazardous area H, from which excess electrical energy must be excluded by barrier isolator device B located in safe area S.

Barrier isolator device B includes a DC-AC converter 11 connected to voltage source 1 and comprising transistors Q41 and Q42 alternately switched to induce an AC signal in the coils S2 and S3 on the secondary side (output) of a transformer T1. A rectifier circuit 12 converts the AC signal induced in the secondary coil S2 of transformer T1 into a DC signal. This rectifier circuit 12, as shown, comprises bridge diodes D51 through D56. A second rectifier circuit 13, comprising diodes D61 through D64, converts the AC signal induced in the secondary coil S3 of transformer T1 into a DC signal.

A current transformer T2 comprises primary coils P11 and P12 having a center tap Pt connected to load 2, and secondary coils S21 and S22 having a center tap St. The current corresponding to transmission signal current Io flowing in the primary coils P11 and P12 is induced in the secondary coils S21 and S22, which connect to a circuit 14 for rectifying and amplifying the current derived from the secondary coils S21 and S22. The rectifying circuit 14, as shown, receives power from rectifying circuit 13.

The load 2, which is a transmitter, receives its power from rectifier circuit 12 by way of a transmission line L and transmits a current signal Io through the transmission line L. Tandem overload protection circuits 3A1 and 3A2 are inserted into the transmission line L adjacent the transmitter 2 so that any electrical energy introduced from power source 1 or recorder 9 into the hazardous area H via the transmission line L is limited to a certain constant value. The overload protection circuits 3A1 and 3A2, similar to that shown in FIG. 4, are duplexed for added safety pursuant to the requirements of intrinsically safe explosion-proof design. As shown in FIG. 9, the operating power for the protection circuit transistors Q11, Q12, Q21 and Q22 is obtained from the middle connection point between the diodes D53 and D54 of the rectifier circuit 12 which is separate from the power source for the transmitter 2. Therefore only the current signal Io transmitted from the transmitter 2 flows in the primary coils P11 and P12 of current transformer T2, and an AC signal accurately corresponding to only the transmission current signal I0 is induced in the secondary coils S21 and S22.

The transistors Q51 and Q52 of the rectifier circuit 14 form a grounded-base transistor circuit with respect to the current transformer T2. A current equal to the current flowing in the base and emitter of transistors Q51 and Q52 flows through an output resistor Ro, and an output signal accurately corresponding to the transmission signal current Io can be obtained from output resistor Ro at terminals 91 and 92, which connect the recorder 9 to barrier isolation device B. By opening switch SW, a DC current signal is obtainable from terminals 92 and 93.

Figure 10:
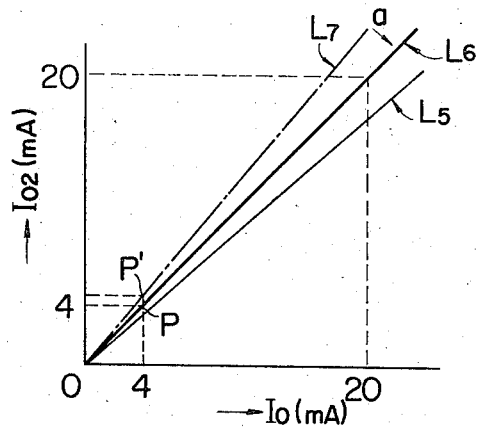
FIG. 10 is a graph illustrating the current transfer characteristic of the transformer shown in FIG. 9.

A range adjustment variable resistor R$v$1 and a zero adjustment variable resistor R$v$2 are provided because the current transformer T2 is not an ideal transformer and, therefore, there is an attenuation due to leakage inductance and copper loss. The transmission signal current Io flowing in the primary coils P11 and P12 is not accurately proportional to the secondary current Io2 flowing in the secondary coils S21 and S22, as illustrated by curve L5 in FIG. 10, which is slightly deviated from the linear curve L6 of an ideal transformer. The range of output Io2 is narrower than the ideal. To solve this problem, the following improvement is made on the current transformer T2. The number of turns of secondary coils S21 and S22 is made slightly smaller than that of primary coils P11 and P12. By this arrangement, the secondary current Io2 is increased with respect to the transmission signal current Io, being inversely proportional to the ratio of turns P11 and P12 to S21 and S22. This characteristic is indicated by curve L7 in FIG. 10, which shows the slope to be slightly steeper than L5, and the range a little greater than the desired range. The span is adjusted to be nearly equal to that obtainable in the ideal transformer by the use of span adjustment variable resistor R$v$1 inserted into the circuit on the side of secondary coils S21 and S22. Variable resistor R$v$1 acts to lower the efficiency of transformer T2, thereby modifying the input current Io vs. output current Io2 characteristic in the direction indicated by arrow a in FIG. 10. The zero point P', which is the reference point, can be adjusted to be nearly equal to the zero point P of the characteristic of the ideal transformer by means of zero adjustment variable resistor R$v$2.

Barrier isolator device B is operated in the following manner. In the normal state, a DC voltage such as 24V is applied to the input terminals 31 and 32 of the tandem overload protection circuits 3A1 and 3A2. Since this voltage is lower than the zener voltage of zener diodes D11 and D12, these diodes do not turn on, the transistors Q11 and Q12 are in the off state, and the transistors Q21 and Q22 are in the on state. The DC voltage (24V) is reduced in value only by the very small voltage drop across the current detecting resistors R41 and R42, and is supplied to the transmitter 2. The signal current Io from the transmitter 2 flows alternately in the primary coils P11 and P12 of current transformer T2, and an AC signal proportional to the signal Io is induced in the secondary coils S21 and S22. This AC signal is rectified and amplified by the rectifier circuit 14, and a DC output, such as DC1 to 5V, proportional to the transmission signal Io is obtained at the output terminals 91 and 92.

In the event of abnormality, the barrier isolator device B is operated in the following manner. If an excess voltage comes in via the power source 1, this excess energy is blocked by the transformer T1. While, if an overvoltage enters the terminal 91 or 92 of the receiving meter 9, this overvoltage is blocked by the current transformer T2. An excess voltage transfer from the primary coil to the secondary coil can be more effectively prevented by the use of false contact preventive plates $s$L1 and $s$L2 for the transformers T1 and T2, which are grounded as indicated by the dotted lines in FIG. 10. If an overvoltage occurs on the side of secondary coil S2 of T1 or on the side of primary coils P11 and P12 of T2, the tandem overload protection circuits 3A1 and 3A2 operate to prevent the excess energy from escaping to transmitter 2.

FIG. 11 shows another barrier isolator device B2 also incorporating tandem overload protection circuits 3A1 and 3A2 of this invention. In this embodiment, the load 2 is a controlled element V located in the hazardous area H and driven by the output of the device 9, which is a controller. A DC current signal such as 4 to 20mA DC is applied across terminals 91 and 92 from the controller 9. This signal is converted into an AC signal by a chopper circuit comprising resistors R61 through R63, diodes D61 through D62, and transistors Q61 and Q62 which are switched on and off by the AC output from the secondary coil S2 of transformer T1. The converted signal is induced in the secondary coils S21 and S22 of transformer T2, and rectified by a rectifier circuit 14 comprising grounded-base transistors Q51 and Q52. The signal then becomes a current signal Ios proportional to the output current from the controller 9 and is transmitted to the controlled element 2 by way of the tandem overload protection circuits 3A1 and 3A2.

A zero adjustment variable resistor R$v$2 provides zero adjustment by flowing current from the chopper exciting coil through a path including R63, R$v$2, P12, C61 and S2, irrespective of the input signal. A span adjustment variable resistor R$v$1 functions similarly to the span adjustment variable resistor shown in FIG. 9. D51 through D54 are diodes, and C2 is a smoothing capacitor, which constitutes a power source circuit for the transistors Q11, Q21, Q12 and Q22 of protective circuits 3A1 and 3A2.

In normal operation of barrier isolator device B2, the DC output signal from controller 9 is charged across the capacitor C61 and then is converted into an AC signal by the switching operation of the transistors Q61 and Q62. This AC signal is isolated by the transformer T2 and applied to the rectifier amplifier circuit 14. A DC voltage is applied to the rectifier amplifier circuit 14 from the capacitor C2 wherein the input AC signal is rectified and amplified. The resultant DC output Ios is supplied to the load via the tandem overload protection circuits 3A1 and 3A2. Thus excess energy from power source 1 or controller 9 is blocked by transformer T1 or T2 and by the overload protection circuits.

Although specific embodiments of the invention have been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

We claim:

1. A barrier isolator device for interconnecting a voltage source in a safe area, a load in a hazardous area, and a load-associated device in a safe area and arranged to prevent excess electrical energy from being applied to the load, comprising
    an overload protection circuit connected to the load and arranged to transmit signals between the load and the load-associated device, and to prevent current and voltage in excess of independent predetermined values from being applied to the load;
    first current isolating means connecting the voltage source with the overload protection circuit for transmitting electrical power to the overload protection circuit; and
    second current isolating means connecting the load-associated device with the overload protection circuit and including a current transformer for transmitting signal changes between the load and the load-associated device,
    whereby transfer of excess electrical energy from the voltage source or from the load-associated device to the load is prevented.

2. A barrier isolating device as claimed in claim 1 wherein said overload protection circuit comprises:
    voltage detection means connected in parallel with the voltage source for detecting said predetermined value of voltage, current detection means connected in series with the load for detecting said predetermined value of current, and current control means connected in series with the load for controlling the current flowing through the load, said current control means responding to the voltage detecting means and to the current detecting means by reducing its conductivity and therefore, the current flowing through the load, whenever either current or voltage is detected to be in excess of said predetermined values, thereby limiting the current and voltage applied to the load.

3. A barrier isolating device as claimed in claim 2 wherein said current control means comprises a controllable device presenting a variable conductivity in series with the load and having an input circuit arranged to receive bias signal causing the device to be conductive, and a control circuit connected to both the voltage detecting means and the current detecting means and having an output circuit connected to the input circuit of the controllable device and diverting the bias signal therefrom whenever either current or voltage is detected to be in excess of said predetermined values.

4. A barrier isolating device as claimed in claim 3 wherein said controllable device comprises a transistor with its collector-emitter circuit in series with the load, and means for supplying a source of bias current to its base to cause the transistor to conduct and wherein the output circuit of the control circuit is connected so as to shunt the base-emitter circuit of the transistor to divert the bias current from the base to cause the transistor to become non-conductive whenever the control circuit output circuit responds to detection of current or voltage in excess of said predetermined values.

5. A barrier isolating device as claimed in claim 4, wherein said control circuit comprises transistor means connected to said voltage and current detecting means and having its output circuit through the collector-emitter circuit of said transistor means.

6. A barrier isolating device as claimed in claim 3, wherein said controllable device comprises transistor means with its collector-emitter circuit connected in series with the load and means for supplying a bias current to its base to cause it to conduct, and a silicon controlled element in series with the load and having a gate terminal and means including said transistor means for applying a gating signal to said gate terminal, said control circuit being arranged to turn off said transistor means whenever either of current or voltage is determined to be in excess of said predetermined values, whereby said gating signal is removed from said silicon controlled element.

7. A barrier isolating device as claimed in claim 6 further comprising a resistor shunting the collector-emitter circuit of said transistor means, said shunting resistor being arranged to conduct a current below the holding current of said silicon controlled element, whereby said silicon controlled element turns off when said transistor means turns off, and whereby said silicon controlled element carries a greater portion of the overload voltage than said transistor means.

8. A barrier isolating device as claimed in claim 1 wherein said current control means comprises a control circuit with input transistor means, said voltage detecting means and current detecting means being applied to said current control means through said input transistor means.

9. A barrier isolating device as claimed in claim 8 wherein said voltage detecting means comprises a resistive voltage divider connected in parallel with said voltage source, the intermediate junction of said voltage divider being connected to the base of said input transistor means through a zener diode.

10. A barrier isolating device as claimed in claim 8 wherein said voltage detecting means comprises a zener diode in series with a resistive voltage divider, the intermediate junction of the voltage divider being connected to the base of said input transistor means.

11. A barrier isolating device as claimed in claim 8 wherein said current detecting means comprises resistive means connected in series with the load and means for applying the voltage across said resistive means to the base-emitter circuit of said input transistor means, whereby when said load current increases, the voltage across the resistive means also increases and turns on said input transistor means.

12. A barrier isolating device as claimed in claim 11 wherein said resistive means is connected at one end to the emitter of said input transistor means, and at the other end through a second resistive means to the base of the input transistor means.

13. A barrier isolating device as claimed in claim 11 wherein said input transistor means comprises first and second transistors having their collectors and emitters connected together, the base of the first transistor being connected to said voltage detecting means, and the second transistor having its base-emitter circuit connected across said resistive means.

14. A barrier isolating device as claimed in claim 2 wherein said current control means includes diode means in series with said load and forward biassed by said voltage source, whereby a voltage overload of opposite polarity to that of the voltage source and exceeding its value will open said diode means and disconnect the load from the voltage source.

15. A barrier isolating device as claimed in claim 2 wherein said current control means includes a controllable element and means for supplying a bias signal to the controllable element, said bias signal means receiving power from said voltage source through said first isolating means.

16. A barrier isolating device as claimed in claim 1 wherein said current transformer for transmitting signal changes between the load and the load-associated device has different numbers of turns on its primary and secondary coils, said second isolating means further comprising a range adjustment resistor connected to the secondary side of the current transformer.

17. A barrier isolating device as claimed in claim 1 wherein said load-associated device is a controller and wherein the load is responsive to the controller.

18. A barrier isolating device as claimed in claim 1 wherein the load is a sensor and the load-associated device is responsive to the sensor.

* * * * *